Feb. 27, 1934.   V. VAVEREK ET AL   1,948,997
DEVICE FOR FACILITATING THE USE OF A CAN
CONTAINING EVAPORATED MILK OR THE LIKE
Filed July 12, 1933   2 Sheets-Sheet 2
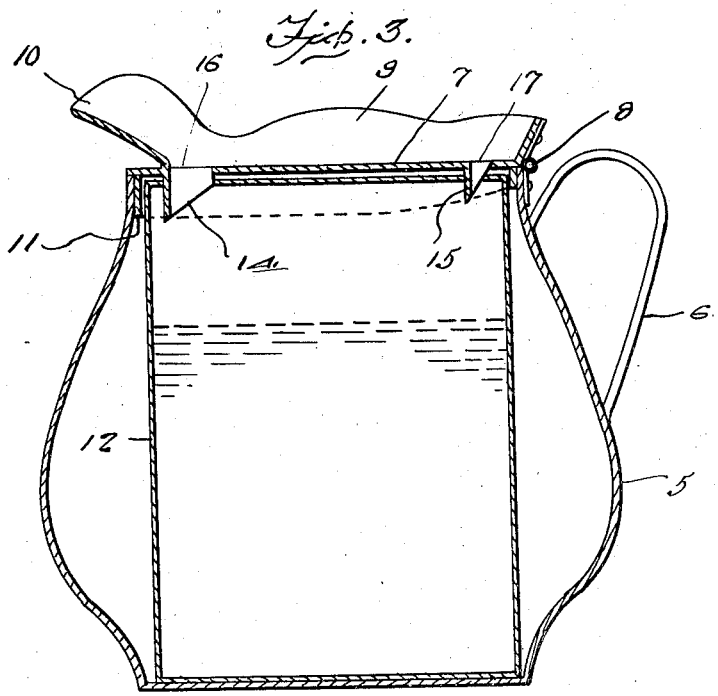
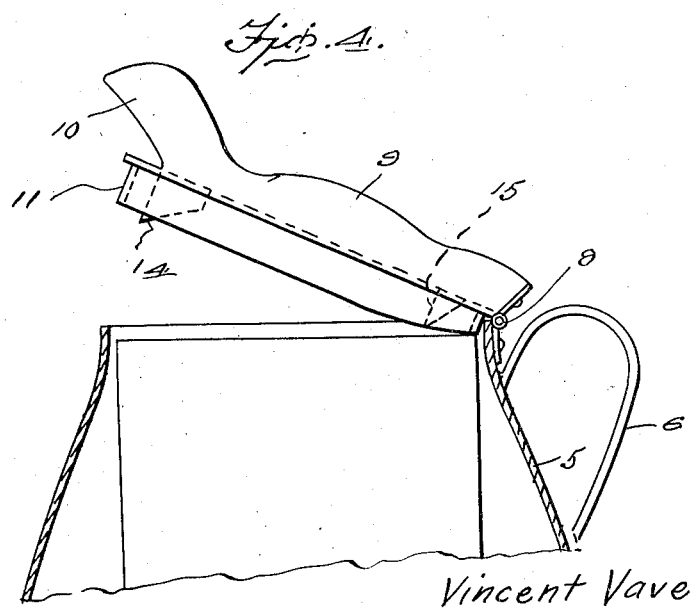
Inventors
Vincent Vaverek
Joseph Heline
By Clarence A. O'Brien
Attorney Patented Feb. 27, 1934

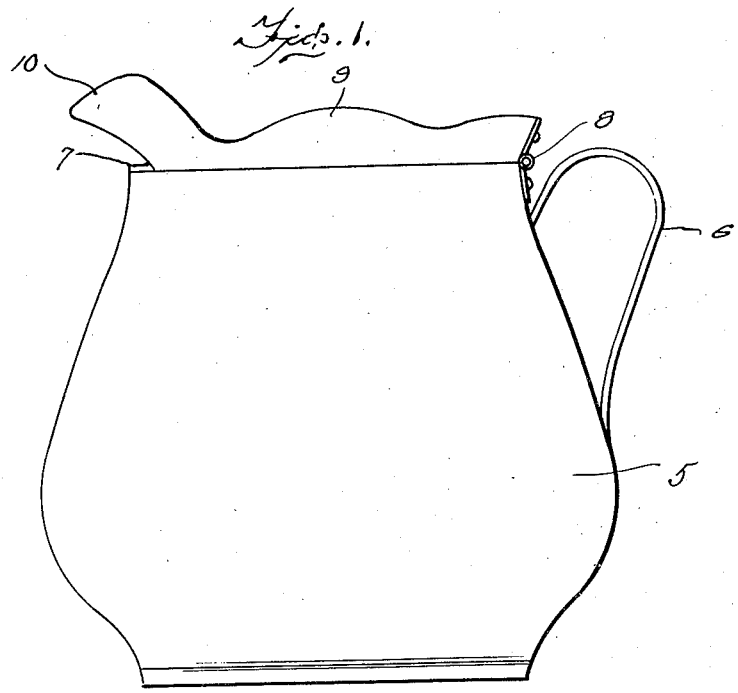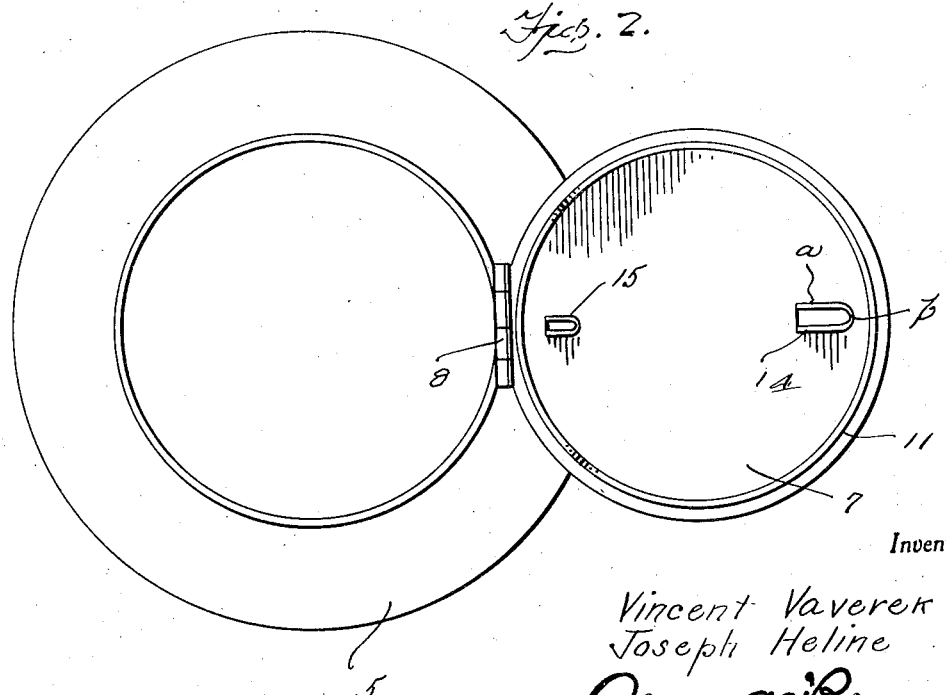

1,948,997

UNITED STATES PATENT OFFICE 1,948,997

DEVICE FOR FACILITATING THE USE OF A CAN CONTAINING EVAPORATED MILK OR THE LIKE

Vincent Vaverek and Joseph Heline, Pontiac, Mich.

Application July 12, 1933. Serial No. 680,146

1 Claim. (Cl. 65—61)

The present invention relates to a device for facilitating the use of a can of evaporated milk or the like and has for its prime object to provide means in which may be mounted a can of evaporated milk or the like and permit the milk to be poured from the can in a handy manner.

Another very important object of the invention resides in the provision of a device of this nature with means for punching the proper holes in the can.

A further important object of the invention resides in the provision of a device of this nature which is simple in its construction, inexpensive to manufacture, easy to manipulate, attractive in appearance, fairly efficient and reliable in use and otherwise well adapted for the purpose for which it is designed.

With the above and numerous other objects in view, as will appear as the description proceeds, the invention consists in certain novel features of construction, and in the combination and arrangement of parts as will be hereinafter more fully described and claimed.

In the drawings:—

Figure 1 is a side elevation of a device embodying the features of my invention, Figure 2 is a top plan view thereof, showing the lid in open position, Figure 3 is a vertical section through the device, Figure 4 is a fragmentary sectional elevation of the upper portion of the device, showing the lid partially open.

Referring to the drawings in detail, it will be seen that numeral 5 denotes a container preferably shaped in simulation of a pitcher and having a handle 6. Numeral 7 denotes a lid hingedly mounted, as at 8, on the container 5. This lid 7 is provided with a flange 9 rising from the lid and flaring outwardly and having a portion thereof formed into a spout 10. A guard and reinforcing ring 11 depends from the lid to telescope into the upper end of the container and to be disposed about the can 12 in the container and assist in properly centering the can with respect to the lid, so that the holes in the top of the can will be punched in the proper place. Depending from the lid 7 are cutting elements 14 and 15 for punching holes in the top of the can. The element 15 is disposed adjacent the hinge 8, while the element 14 is disposed adjacent the spout 10. These elements are of a somewhat U-shaped formation, as shown in Figure 2, and include side walls $a$ and bight portion $b$, the bight portion being provided with a cutting edge and the edges of the sides $a$ being inclined, as is clearly shown in Figure 3. The lid 7 is provided with openings 16 and 17 registering with the spaces confined by the cutting elements.

The can is placed in the container 5 and then the lid is closed and as it is closed, the cutting elements 14 and 15 punch the necessary holes in the can. The hole punched by the element 14 is the pouring hole, while the hole punched by the element 15 is the vent hole. When the cover is fully closed, the milk from the can may be poured by using the device in a manner similar to an ordinary pitcher.

It is thought that the construction, utility and advantages of this invention will now be clearly understood to those skilled in this art without a more detailed description thereof.

The present embodiment of the invention has been described in considerable detail merely for the purposes of exemplification, since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:—

A device of the class described comprising an open top container for receiving a can, a flat lid for the container, an annular ring depending from the lid to telescope inside the upper end of the container and to be disposed about the upper end of a can in the container, said ring being slightly spaced inwardly from the periphery of the lid and said lid having a pair of openings therein arranged diametrically opposite each other and spaced inwardly from the ring, a pair of cutting elements depending from the lid adjacent the openings, a flange rising from the lid, a hinge connecting a part of the flange to a part of the container, a portion of the flange forming a spout which is located diametrically opposite the hinge, said spout receiving the liquid flowing from that opening which is remote from the hinge, the other opening being located adjacent that part of the flange to which the hinge is connected.

VINCENT VAVEREK.
JOSEPH HELINE.